US012580651B2

(12) United States Patent
Saito et al.

(10) Patent No.: US 12,580,651 B2
(45) Date of Patent: Mar. 17, 2026

(54) COMMUNICATION MODULE AND ELECTROMAGNETIC FLUX CONTROLLING MEMBER

(71) Applicant: Enplas Corporation, Saitama (JP)

(72) Inventors: Tomohiro Saito, Saitama (JP); Shimpei Morioka, Saitama (JP)

(73) Assignee: Enplas Corporation, Saitama (JP)

( * ) Notice: Subject to any disclaimer, the term of this patent is extended or adjusted under 35 U.S.C. 154(b) by 293 days.

(21) Appl. No.: 18/544,778

(22) Filed: Dec. 19, 2023

(65) Prior Publication Data

US 2024/0223276 A1 Jul. 4, 2024

(30) Foreign Application Priority Data

Jan. 4, 2023 (JP) ................................. 2023-000273

(51) Int. Cl.
*H04B 10/11* (2013.01)

(52) U.S. Cl.
CPC .................................... *H04B 10/11* (2013.01)

(58) Field of Classification Search
None
See application file for complete search history.

(56) References Cited

U.S. PATENT DOCUMENTS

| | | | |
|---|---|---|---|
| 6,195,058 B1 * | 2/2001 | Nakamura | ............. H01Q 19/08 |
| | | | 343/753 |
| 2004/0108963 A1 | 6/2004 | Clymer et al. | |
| 2022/0326417 A1 * | 10/2022 | Suganuma | ............. H01Q 15/08 |
| 2022/0365252 A1 * | 11/2022 | Chen | ..................... G06F 3/0304 |

FOREIGN PATENT DOCUMENTS

JP          2005-536929          12/2005

* cited by examiner

*Primary Examiner* — David W Lambert

(57) ABSTRACT

A communication module of the present invention is a communication module including a transmission/reception part and an electromagnetic flux controlling member. The electromagnetic flux controlling member includes a first surface and a second surface. The first surface of the electromagnetic flux controlling member includes a first region including an incidence portion of near-axis light to be converged at a first focal position, the near-axis light being located closest to a central axis of the electromagnetic flux controlling member, and a second region disposed in a region surrounding the first region and including an incidence portion of light to be converged at a second focal position when parallel light is entered from the first surface and emitted from the second surface. The second focal position is located at a position farther from the electromagnetic flux controlling member than the first focal position.

7 Claims, 7 Drawing Sheets

20

30

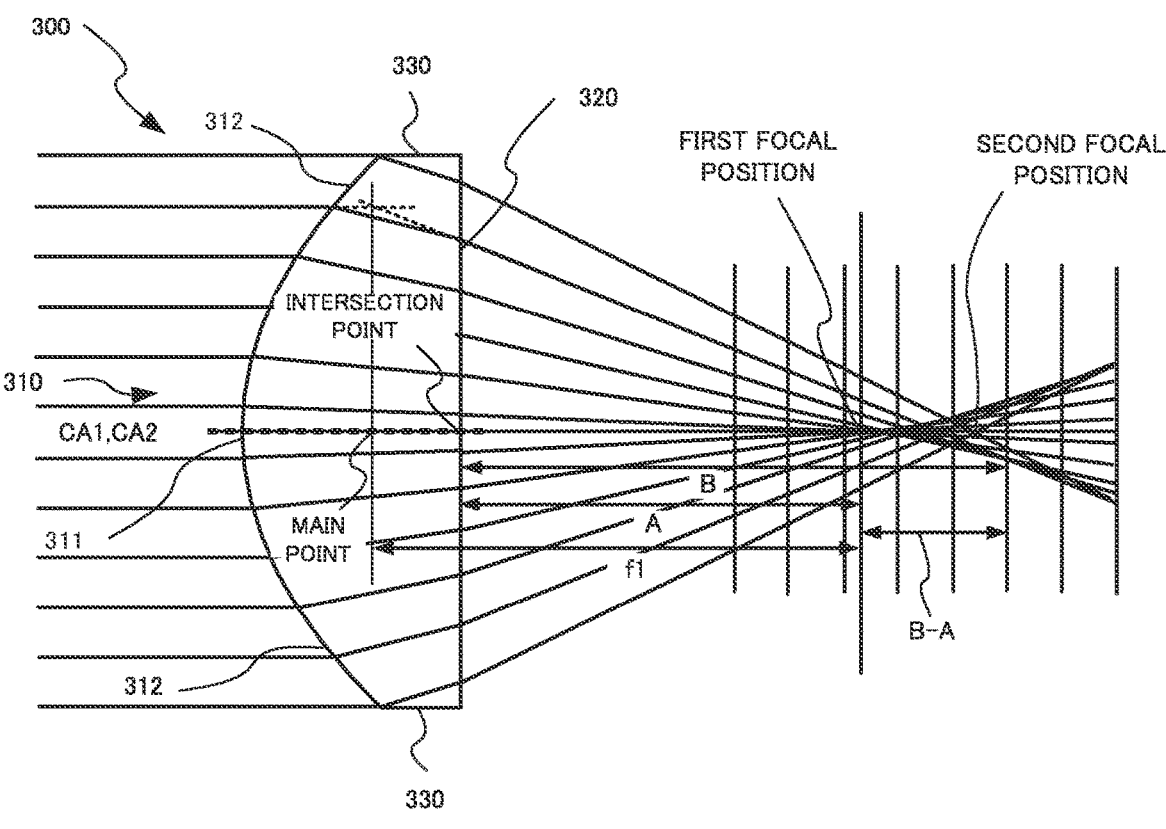
FIG. 3A
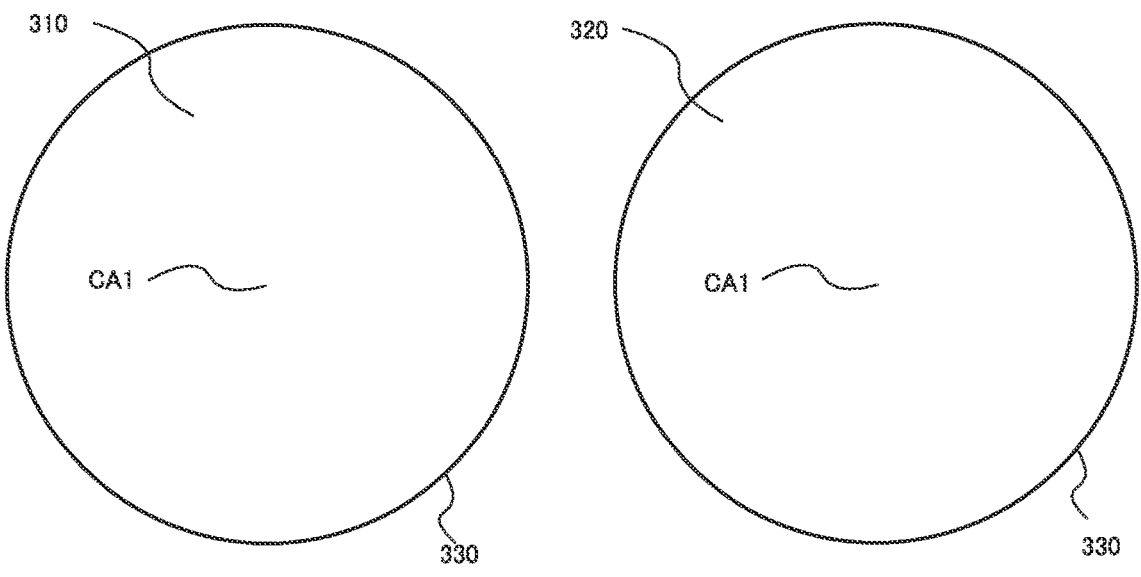
FIG. 3B
FIG. 3C

COMMUNICATION MODULE AND ELECTROMAGNETIC FLUX CONTROLLING MEMBER

CROSS REFERENCE TO RELATED APPLICATIONS

This application claims the benefit of priority of Japanese Patent Application No. 2023-000273, filed on Jan. 4, 2023, the contents of which are incorporated by reference as if fully set forth herein in their entirety.

TECHNICAL FIELD

The present invention relates to a communication module and an electromagnetic flux controlling member.

BACKGROUND ART

In radio communications, it is known to use an electromagnetic flux controlling member as a means for transmitting more information with high efficiency over long distances. Electromagnetic flux controlling members have a function of controlling the travelling direction of electromagnetic waves including radio waves such as a function of converting spherical waves into plane waves, and in recent years they are increasingly used for electromagnetic waves including radio waves with short wavelengths such as quasi-millimeter waves, millimeter waves and terahertz waves.

For example, PTL 1 discloses a device including a horn antenna and a dielectric lens (electromagnetic flux controlling member).

CITATION LIST

Patent Literature

PTL 1
    Japanese Unexamined Patent Application Publication (Translation of PCT Application) No. 2005-536929

SUMMARY OF INVENTION

Technical Problem

Desirably, the electromagnetic flux controlling member controls an electromagnetic flux emitted from a transmission part such that more electromagnetic flux reaches the reception part to increase the gain.

As illustrated in FIG. 1A, the present inventors attempted to increase the gain by using electromagnetic flux controlling member 20 with a shape of a planoconvex-lens having a spherical surface as a convex surface. More specifically, the present inventors attempted to increase the gain in a case where an electromagnetic flux from a horn antenna is entered from the flat surface side of the electromagnetic flux controlling member and emitted from the spherical surface, and, the parallelized electromagnetic flux is received by a receiver disposed at a remote location.

In general, as illustrated in FIG. 1A, the refracted electromagnetic flux entered from the spherical surface does not converge at one point due to spherical aberration. As such, if the transmission and reception are performed by using the above-described electromagnetic flux controlling member, the electromagnetic flux emitted from the spherical surface may become non-uniform in phase, resulting in poor gain. In view of this, as illustrated in FIG. 1B, the present inventors attempted to perform the above-described transmission and reception by using electromagnetic flux controlling member 30 with a shape including a convex surface with a corrected spherical aberration with which the refracted electromagnetic flux entered from the spherical surface converges at one point as much as possible. Specifically, the present inventors placed the transmission part at the converge point in FIG. 1B and emitted the electromagnetic flux from the spherical surface to receive it at the reception part. The present inventors conceived that in this manner the phase of the electromagnetic flux emitted in a parallel form from the spherical surface is likely to be uniform and the gain is maximized.

As a result of an extensive study, the present inventors found a configuration that can further increase the gain than the above-mentioned configurations.

An object of the present invention is to provide a communication module including a transmission/reception part and an electromagnetic flux controlling member that can achieve favorable gain. In addition, another object of the present invention is to provide an electromagnetic flux controlling member using the communication module.

Solution to Problem

The present invention relates to the following communication module and electromagnetic flux controlling member.

[1] A communication module including: a transmission/reception part configured to transmit or receive an electromagnetic flux; and an electromagnetic flux controlling member configured to control the electromagnetic flux from the transmission/reception part or the electromagnetic flux to the transmission/reception part. The electromagnetic flux controlling member includes a first surface and a second surface, the first surface being a convex surface located on a side remote from the transmission/reception part, the second surface being a surface located on a side close to the transmission/reception part. The first surface of the electromagnetic flux controlling member includes a first region including an incidence portion of near-axis light to be converged at a first focal position, the near-axis light being located closest to a central axis of the electromagnetic flux controlling member, and a second region disposed in a region surrounding the first region and including an incidence portion of light to be converged at a second focal position when parallel light is entered from the first surface and emitted from the second surface. The second focal position is located at a position farther from the electromagnetic flux controlling member than the first focal position.

[2] The communication module according to [1], in which $(B-A)/f1$ satisfies 0.1 to 1, where f1 is a focal length of the electromagnetic flux controlling member, B is a distance to the second focal position from an intersection of the central axis of the electromagnetic flux controlling member and the second surface, and A is a distance from the intersection to the first focal position.

[3] The communication module according to [2], in which $(B-A)/f1$ satisfies 0.1 to 1 when the second focal position is set as a position where light entered from an outer edge of the first surface converges.

[4] The communication module according to any one of [1] to [3], in which a transmission/reception surface of the transmission/reception part is disposed between the first focal position and the second focal position, near the first focal position, or near the second focal position.

[5] The communication module according to any one of [1] to [4], in which the second surface is a flat surface, a concave surface, or a convex surface.

[6] The communication module according to any one of [1] to [5], in which the transmission/reception part transmits or receives a millimeter wave, a quasi-millimeter wave, or a terahertz wave.

[7] An electromagnetic flux controlling member configured to be used for the communication module according to any one of [1] to [6].

Advantageous Effects of Invention

According to the present invention, it is possible to provide a communication module including a transmission/reception part and an electromagnetic flux controlling member that can achieve favorable gain. In addition, according to the present invention, it is possible to provide an electromagnetic flux controlling member configured to be used for the communication module.

BRIEF DESCRIPTION OF DRAWINGS

FIG. 3A is a diagram illustrating an aspect of a control of parallel light performed by an electromagnetic flux controlling member according to Embodiment 1, FIG. 3B is a plan view illustrating the electromagnetic flux controlling member according to Embodiment 1 as viewed from a first surface side, and FIG. 3C is a plan view as viewed from a second surface side;

DESCRIPTION OF EMBODIMENTS

Embodiment 1

Communication Module

Figure 2:
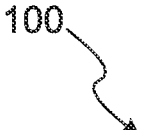
FIG. 2 is a diagram schematically illustrating a communication module.
Figure 2:
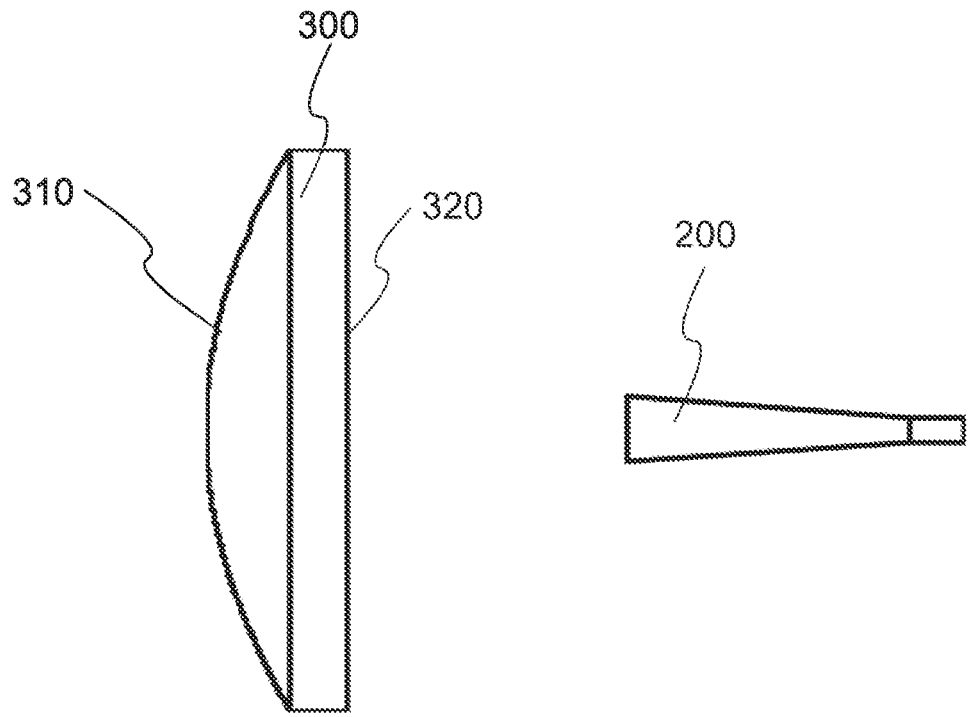

As illustrated in FIG. 2, communication module 100 according to the present embodiment includes transmission/reception part 200 and electromagnetic flux controlling member 300. Communication module 100 may be used as a transmission module and/or a reception module.

In the case where communication module 100 is used as a transmission module, a radially spread electromagnetic flux from transmission/reception part 200 is controlled into an approximately parallel electromagnetic flux by electromagnetic flux controlling member 300. The electromagnetic flux controlled to be approximately parallel is received by a reception part located at a distant location. Note that more specifically, the electromagnetic flux is electromagnetic waves. Therefore, the electromagnetic flux may be read as electromagnetic waves.

In the case where communication module 100 is used as a reception module, an electromagnetic flux emitted from a transmission part located at a distant location is controlled by electromagnetic flux controlling member 300, and converged and received at transmission/reception part 200.

Transmission/Reception Part

Transmission/reception part 200 may be a transmission part that transmits an electromagnetic flux, or a reception part that receives an electromagnetic flux. The electromagnetic flux to be transmitted or received is not limited, but is preferably millimeter waves, quasi-millimeter waves, or terahertz waves. More specifically, the wavelength of the electromagnetic flux is preferably 260 to 280 GHz, more preferably 270 GHz. Examples of transmission/reception part 200 include a horn antenna.

Electromagnetic Flux Controlling Member

Electromagnetic flux controlling member 300 controls the electromagnetic flux from transmission/reception part 200, or the electromagnetic flux to the transmission/reception part. Preferably, the material of electromagnetic flux controlling member 300 is, but not limited to, a high dielectric constant material with a relative permittivity of 5 or greater, because such a material can refract the electromagnetic flux and achieve the effects of the present invention, for example. Examples of the material of the electromagnetic flux controlling member include resin, ceramic, and glass. Examples of the resin include polypropylene, poly cycloolefin, polytetrafluoroethylene, and modified polyphenylene ether. In addition, preferably, electromagnetic flux controlling member 300 is integrally molded by injection molding or the like, for example. Preferably, electromagnetic flux controlling member 300 is a member rotationally symmetrical about central axis CA1.

FIG. 3A is a cross-sectional view of electromagnetic flux controlling member 300 including central axis CA1 of electromagnetic flux controlling member 300. FIG. 3A also illustrates a state where electromagnetic flux controlling member 300 controls a parallel light. In FIG. 3A, hatching is omitted to illustrate a state of a control of parallel light.

FIG. 3B is a plan view of electromagnetic flux controlling member 300 as viewed from first surface 310 side described later, and FIG. 3C is a plan view as viewed from second surface 320 side described later.

As illustrated in FIG. 3A, electromagnetic flux controlling member 300 includes first surface 310 as a convex surface, second surface 320, and side surface 330. Each component is described below.

First surface 310 is a surface remote from transmission/reception part 200 in electromagnetic flux controlling member 300 (see FIG. 2). In the case where communication module 100 is used as a transmission module, first surface 310 is a surface from which the electromagnetic flux of transmission/reception part 200 is emitted. On the other hand, in the case where communication module 100 is used as a reception module, first surface 310 is a surface from which the electromagnetic flux to transmission/reception part 200 enters.

In the present embodiment, first surface 310 is a convex surface, or more specifically a curved surface. Note that as elaborated later, the curved surface is not a spherical surface, but is an aspherical surface. In the present embodiment, first surface 310 is disposed to intersect central axis CA1 of electromagnetic flux controlling member 300. When parallel electromagnetic flux or light is incident on first surface 310 as a convex surface as illustrated in FIG. 3A, first surface 310 refracts and converges the parallel electromagnetic flux or light. Conversely, when emitting radially spread electromagnetic flux or light, it refracts it into a parallel form.

In addition, as is clear from FIG. 3B, in the present embodiment, first surface 310 has a circular shape around central axis CA1 in plan view.

Second surface 320 is a surface closer to transmission/reception part 200 in electromagnetic flux controlling member 300 (see FIG. 2). In the case where communication module 100 is used as a transmission module, second surface 320 is a surface from which the electromagnetic flux from transmission/reception part 200 enters. On the other hand, in the case where communication module 100 is used as a reception module, second surface 320 is a surface from which the electromagnetic flux to transmission/reception part 200 is emitted.

Second surface 320 may be a flat surface, a concave surface, or a convex surface. A case where second surface 320 is a concave surface corresponds to Embodiment 2 described later, and a case where second surface 320 is a convex surface corresponds to Embodiment 3 described later.

In the present embodiment, second surface 320 is a flat surface as illustrated in FIG. 3A. Specifically, in the present embodiment, electromagnetic flux controlling member 300 has a shape of a planoconvex lens. In the present embodiment, second surface 320 is disposed to intersect central axis CA1 of electromagnetic flux controlling member 300. When emitting parallel electromagnetic flux or light entered from first surface 310 as illustrated in FIG. 3A, second surface 320 refracts the electromagnetic flux or light in a converging manner. Conversely, when entering radially spread electromagnetic flux or light, it refracts the radially spread electromagnetic flux or light in a direction toward the parallel direction.

In addition, as is clear from FIG. 3C, in the present embodiment, second surface 320 has a circular shape around central axis CA1 in plan view.

Side surface 330 may be or may not be provided. In the present embodiment, side surface 330 is located between first surface 310 and second surface 320, with one end connected to the outer edge of first surface 310 and the other end connected to the outer edge of second surface 320. In the present embodiment, side surface 330 has a shape of a side surface of a column. In the case where side surface 330 is not provided, the outer edge of first surface 310 and the outer edge of second surface 320 are directly connected to each other.

Electromagnetic flux controlling member 300 provided with first surface 310 and second surface 320 described above is configured to be able to control parallel light as illustrated in FIG. 3A.

Specifically, it includes first region 311 and including a portion where near-axis light to be converged at a first focal position enters, the near-axis light being closest to central axis CA1 of electromagnetic flux controlling member 300, and second region 312 disposed in a region surrounding first region 311 and including a portion where light to be converged at a second focal position enters, when parallel light is entered from first surface 310 and emitted from second surface 320. The second focal position is farther from electromagnetic flux controlling member 300 than the first focal position.

More specifically, in the present embodiment, parallel light is entered from first surface 310 in such a manner that optical axis CA2 coincides with central axis CA1. Thus, in the present embodiment, the above-mentioned near-axis light closest to central axis CA1 coincides with the near-axis light beam closest to optical axis CA2.

In addition, in the present embodiment, as illustrated in FIG. 3A, (B−A)/f1 satisfies 0.1 to 1, where f1 is the focal length of a case where parallel light is entered from first surface 310 of electromagnetic flux controlling member 300, B is the distance to the second focal position from the intersection of central axis CA1 and second surface 320 of electromagnetic flux controlling member, and A is the distance from the intersection to the first focal position. Note that in the present invention, it is preferable that (B−A)/f1 satisfy 0.1 to 1 regardless of the shape of the electromagnetic flux controlling member (e.g., regardless of whether the electromagnetic flux controlling member has a planoconvex lens shape, a meniscus lens shape, or a biconvex lens shape).

Note that in the present embodiment, focal length f1 is a length from the main point to the first focal position in the case where parallel light is entered from first surface 310. In addition, in the present embodiment, the main point is an intersection point of central axis CA1 (optical axis CA2) and a main plane, which is the collection of intersections between the extensions of the parallel light before the incidence on first surface 310 and extensions of light beams emitted from second surface 320. In the present embodiment, the above-described main point is located 2.7 mm from second surface 320 inside electromagnetic flux controlling member 300.

Note that in the case where the electromagnetic flux controlling member has a planoconvex lens shape as in the present embodiment, it is more preferable that (B−A)/f1 be 0.1 to 0.5. In addition, in the present embodiment, (B−A) and f1 are the length in the direction parallel to the parallel light (the direction parallel to central axis CA1 and the direction parallel to optical axis CA2).

As described above, second region 312 needs only to be disposed in a region surrounding first region 311, and the second region needs only to include an incidence portion of light to be converged at the second focal position farther from electromagnetic flux controlling member 300 than the first focal position. In the present embodiment, a plurality of the second focal positions is provided, but preferably (B−A)/f1 satisfies 0.1 to 1, more preferably 0.1 to 0.5 when the second focal position is set as a position where light entered from the outer edge of first surface 310 converges.

In addition, it is preferable that electromagnetic flux controlling member 300 be configured such that the second focal position becomes farther from electromagnetic flux controlling member 300 as the position of light incident on second region 312 comes closer to the outer edge of first surface 310.

Figures 1A, 1B:
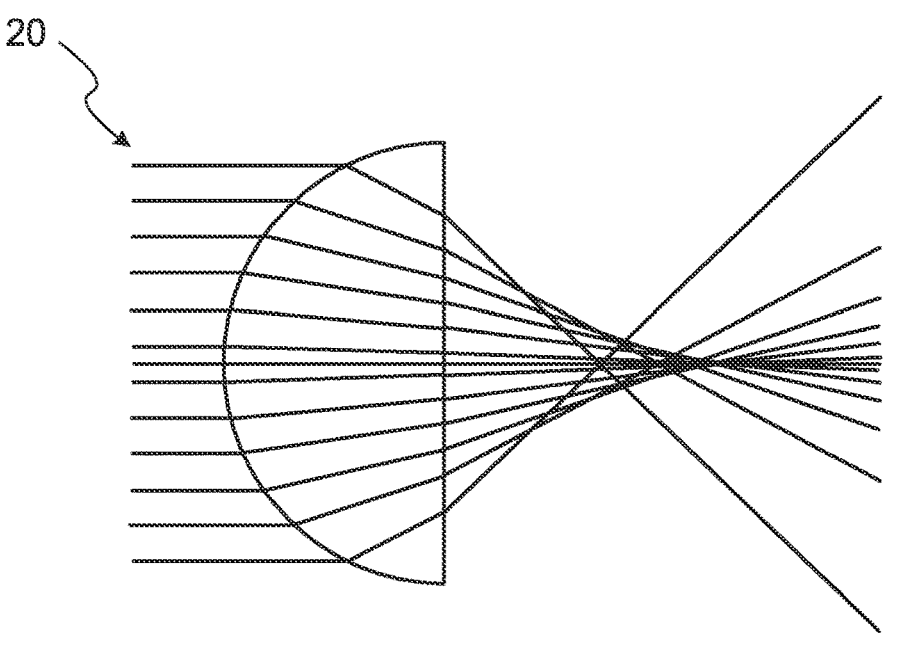
FIGS. 1A and 1B are diagrams illustrating an aspect of a control of parallel light performed by an electromagnetic flux controlling member.

The above-described electromagnetic flux controlling member 300 according to the present embodiment has a shape in which only the curvature radius of the lens peripheral portion (second region 312) is increased without changing the curvature radius of the lens center portion (first region 311) in the optimized lens with a corrected spherical aberration (see FIG. 1B). That is, when inverse ray tracing is performed (when a light beam is traced from the first surface 310 side), the intersecting position of the light beam transmitted and refracted at the position closest to the central axis of the lens with the optical axis is the same as the optimized lens, while the curvature radius of the lens peripheral portion (second region 312) is greater than that of the optimized lens.

Preferably, transmission/reception part 200 for transmitting the electromagnetic flux is disposed in the following manner with respect to electromagnetic flux controlling member 300 with the above-mentioned configuration.

Specifically, preferably, the transmission/reception surface of transmission/reception part 200 is disposed between the first focal position and the second focal position, near the first focal position, or near the second focal position. More specifically, there is a position where the gain is maximized in the above-mentioned area with respect to electromagnetic flux controlling member 300. Therefore, preferably, it is disposed at a position where the gain is maximized in the above-mentioned areas. In this manner, a communication module with a favorable gain can be obtained.

Note that in the present embodiment, the transmission/reception surface is a portion closest to electromagnetic flux controlling member 300 in a portion where the electromagnetic flux passes in transmission/reception part 200. For example, in the case where transmission/reception part 200 is a member such as a horn antenna with an opening, a virtual plane closing the opening may be regarded as the transmission/reception surface.

In addition, in the present embodiment, a range near something needs only to be within a range of (B−A)×0.2 or smaller, for example.

Simulations

Simulations of examples and comparative examples are described below.

Figure 4:
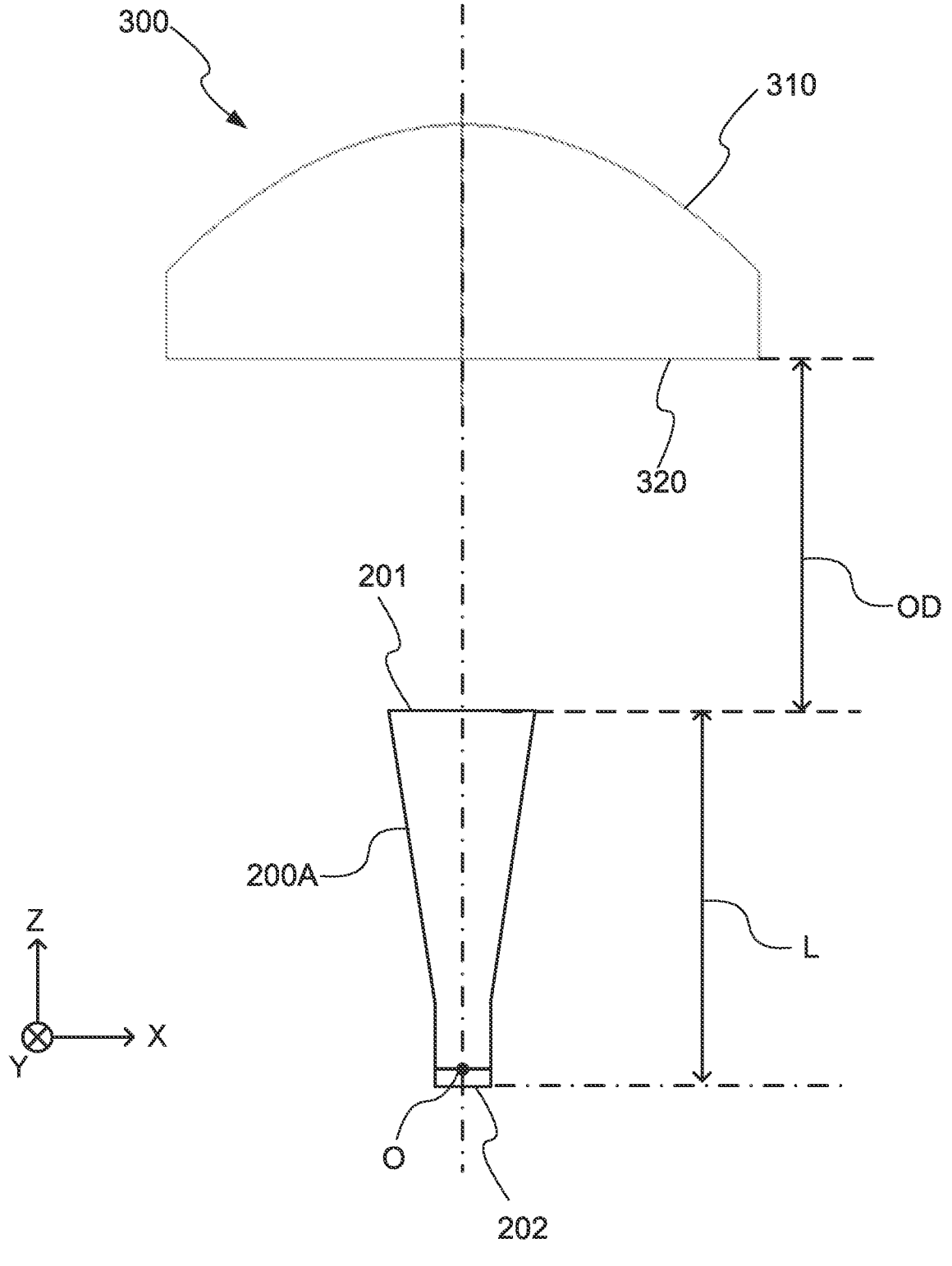
FIG. 4 is a diagram for describing a simulation.

FIG. 4 is a diagram for describing a condition of a simulation. In the simulations, the above-mentioned electromagnetic flux controlling member 300 was used in the example, and electromagnetic flux controlling member 30 (optimized lens) with a corrected spherical aberration as that illustrated in FIG. 1B was used in the comparative example. Further, as transmission/reception part 200, horn antenna 200A was used. As illustrated in FIG. 4, the distance between second surface 320 of electromagnetic flux controlling member 300 and the transmission/reception surface of horn antenna 200A was set as OD. Note that the same applies to the comparative examples.

Figure 5A:
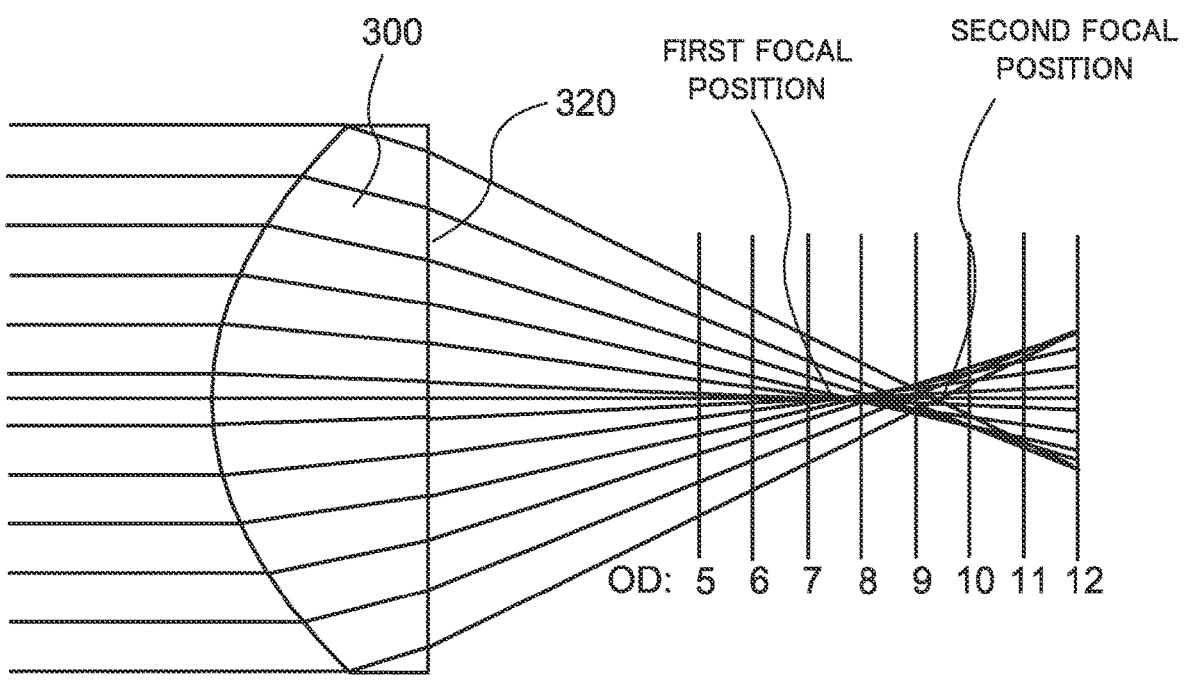
FIGS. 5A and 5B are diagrams for describing a simulation.
Figure 5B:
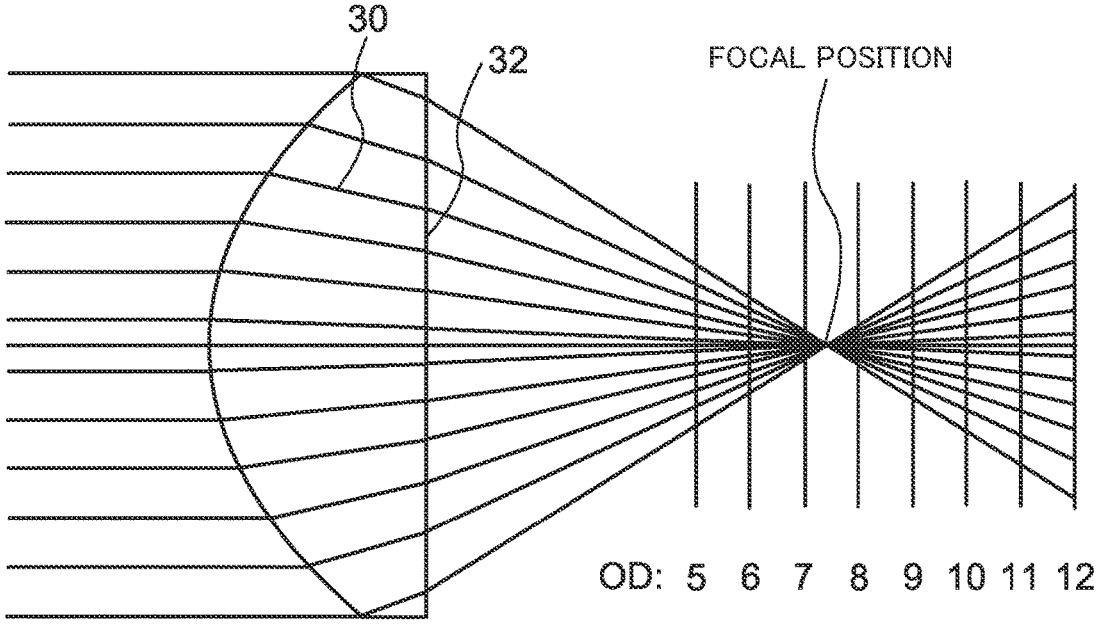

FIG. 5A illustrates a simulation of an example, and FIG. 5B illustrates a simulation of a comparative example. Note that the simulation is a simulation using the communication module as a transmission module. In the simulation, as illustrated in FIGS. 5A and 5B, the variations in the maximum gain and dBi when OD is changed by 1 mm in the range of 5 to 12 mm were examined. Note that the horn antenna was disposed such that its central axis is located on the extension of central axis CA1 of electromagnetic flux controlling member. In addition, FIG. 5A illustrates the first focal position and the second focal position for reference purposes, and FIG. 5B illustrates the focal position for reference purposes.

As illustrated in FIGS. 5A and 5B, the first focal position of the example is a position with an OD of 7.3 mm, and the focal position of the comparative example is also a position with an OD of 7.3 mm.

In addition, as illustrated in FIG. 4, horn antenna 200A includes upper opening 201 close to the electromagnetic flux controlling member, and lower opening 202 remote from the electromagnetic flux controlling member. Upper opening 201 has a rectangular shape with a size of 2.5 mm long×1.8 mm wide, and lower opening 202 has a rectangular shape with a size of 0.9 mm long×0.4 mm wide. In addition, the horn antenna has a length L of 6 mm. Further, a radio wave source was disposed at a position 1 mm above lower opening 202 of horn antenna 200A. O represents the center of the radio wave source. The frequency of electromagnetic waves was set to 270 GHz, and the wavelength was set to 1.1 mm.

The diameter of the electromagnetic flux controlling member was 10 mm, and the height was 5 mm. The material of the electromagnetic flux controlling member was polypropylene. The analysis of the electromagnetic waves was performed with a multilevel fast multipole method (MLFMM). In analysis results, dBi represents antenna gain Gd in the far field. Simulation results are shown in the following Table 1.

TABLE 1

| OD | Example | | Comparative example | |
|---|---|---|---|---|
| (mm) | Gain | dBi | Gain | dBi |
| 5 | 400 | 26 | 305 | 24.8 |
| 6 | 485 | 26.8 | 410 | 26.1 |
| 7 | 510 | 27.1 | 490 | 26.9 |
| 8 | 475 | 26.8 | 500 | 27 |
| 9 | 395 | 26 | 470 | 26.7 |
| 10 | 310 | 24.9 | 435 | 26.4 |
| 11 | 240 | 23.8 | 375 | 25.7 |
| 12 | 180 | 22.5 | 325 | 25.1 |

As is clear from Table 1, in the example, a maximum gain of 510 and a maximum dBi of 27.1 were obtained with the OD of 7 mm. On the other hand, in the comparative example, a maximum gain of 500 and a maximum dBi of 27.0 were obtained with the OD of 8.

In this manner, it can be seen that the example including the first focal position and the second focal position achieved a maximum gain greater than that of the comparative example including one focal point with the corrected spherical aberration.

Effects

Electromagnetic flux controlling member 400 in the present embodiment is configured to include the above-mentioned first focal position and second focal position. In this manner, with communication module 100 including electromagnetic flux controlling member 400, a favorable gain can be obtained.

Embodiment 2

Figure 6A:
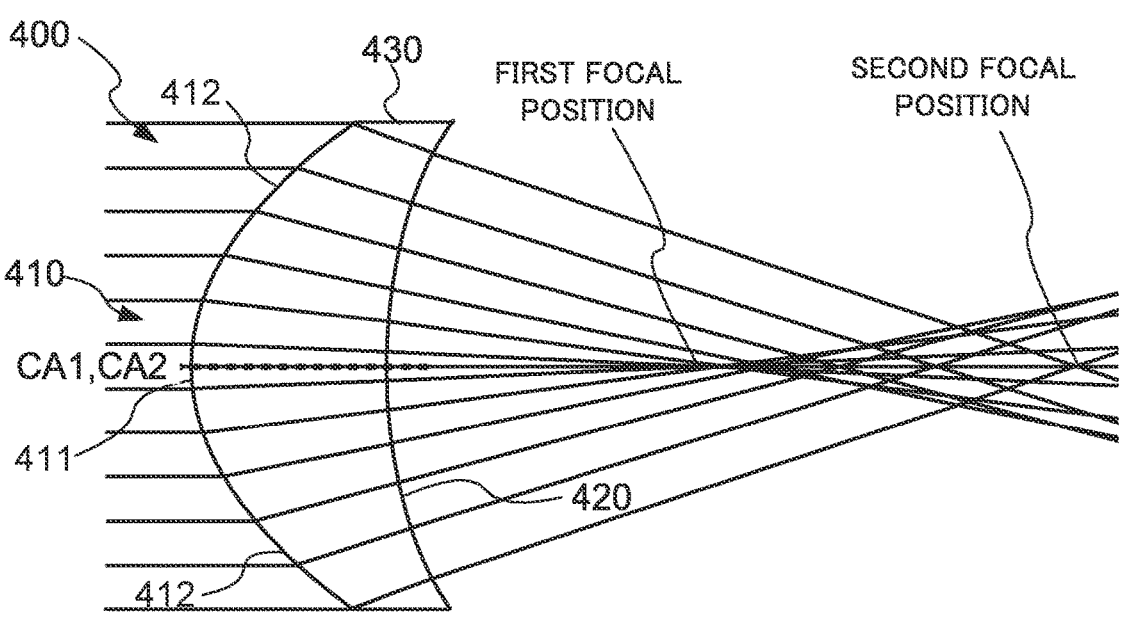
FIGS. 6A to 6C are diagrams illustrating an electromagnetic flux controlling member according to Embodiment 2.
Figures 6B, 6C:
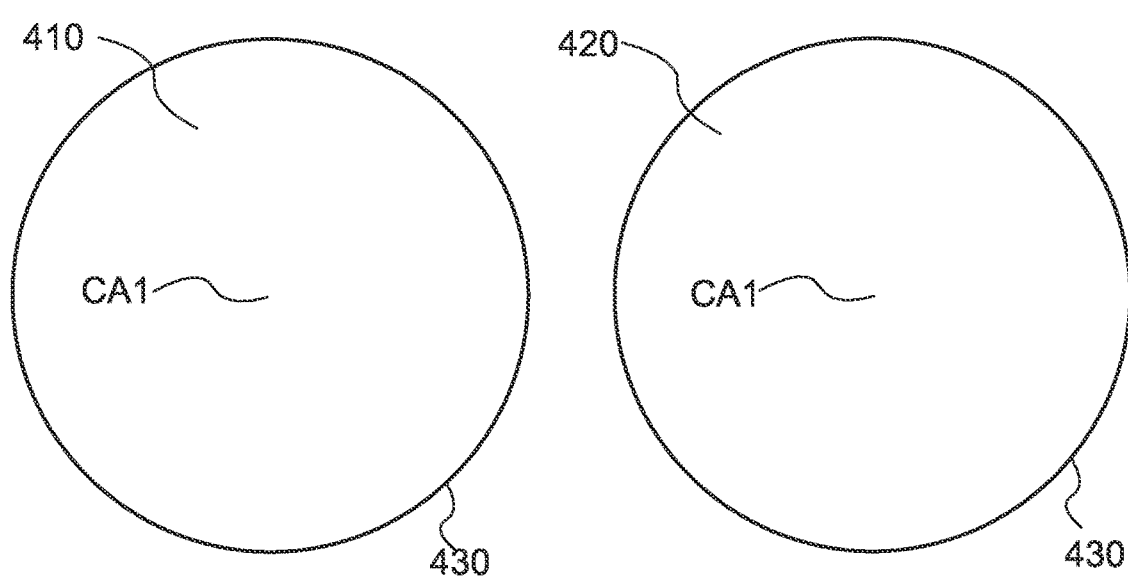

A communication module according to Embodiment 2 includes electromagnetic flux controlling member 400. FIG. 6A illustrates a cross-section including central axis CA1 of electromagnetic flux controlling member 400 according to Embodiment 2, FIG. 6B is a plan view as viewed from first surface 410, and FIG. 6C is a plan view as viewed from second surface 420.

In electromagnetic flux controlling member 400, first surface 410 is a convex surface as in electromagnetic flux controlling member 300, but electromagnetic flux controlling member 400 is different from electromagnetic flux controlling member 300 in that second surface 420 is a concave surface. Specifically, electromagnetic flux controlling member 400 has a meniscus lens shape. The configuration of electromagnetic flux controlling member 400 is substantially the same as that of electromagnetic flux controlling member 300 except that second surface 420 is a concave surface.

As illustrated in FIG. 6A, second surface 420 is disposed to intersect central axis CA1.

Electromagnetic flux controlling member 400 may or may not include side surface 430. In the present embodiment, electromagnetic flux controlling member 400 includes side surface 430.

Electromagnetic flux controlling member 400 including first surface 410 and second surface 420 is configured to be able to control parallel light as illustrated in FIG. 6A.

Specifically, in electromagnetic flux controlling member 400, as in electromagnetic flux controlling member 300, first surface 410 includes first region 411 including an incidence portion of the near-axis light to be converged at the first focal position, the near-axis light being located closest to central axis CA1 of electromagnetic flux controlling member 400, and second region 412 disposed in a region surrounding first region 411 and including an incidence portion of light to be converged at the second focal position when parallel light is entered from first surface 410 and emitted from second surface 420. The second focal position is located at a position farther from electromagnetic flux controlling member 400 than the first focal position.

More specifically, in the present embodiment, the parallel light is entered from first surface 310 such that optical axis CA2 coincides with central axis CA1. Thus, in the present embodiment, the above-mentioned near-axis light closest to central axis CA1 coincides with the near-axis light beam closest to optical axis CA2.

In addition, in the present embodiment, (B–A)/f1 satisfies 0.1 to 1, where f1 is the focal length of a case where parallel light is entered from first surface 410 of electromagnetic flux controlling member 400, B is the distance to the second focal position from the intersection of central axis CA1 of electromagnetic flux controlling member and second surface 420, and A is the distance from the intersection to the first focal position.

Note that preferably, in the case where the electromagnetic flux controlling member has a meniscus lens shape as in the present embodiment, (B–A)/f1 is 0.5 to 1, more preferably 0.5 to less than 1. In addition, in the present embodiment, (B–A) and f1 are the length in the direction parallel to the parallel light (the direction parallel to central axis CA1 and the direction parallel to optical axis CA2).

As described above, second region 412 needs only to be disposed in a region surrounding first region 411, and second region 412 needs only to include an incidence portion where a light to be converged at the second focal position farther from the electromagnetic flux controlling member than the first focal position. In the present embodiment, a plurality of the second focal positions is provided, but preferably (B–A)/ f1 satisfies 0.1 to 1, more preferably 0.5 to 1, still more preferably 0.5 to less than 1 when the second focal position is set as a position where light entered from the outer edge of first surface 310 converges.

In addition, it is preferable that electromagnetic flux controlling member 400 be configured such that the second focal position becomes farther from electromagnetic flux controlling member 400 as the position of light incident on second region 412 comes closer to the outer edge of first surface 410.

Preferably transmission/reception part 200 is disposed with respect to electromagnetic flux controlling member 400 with the above-mentioned configuration in the following manner.

Specifically, preferably, the transmission/reception surface of transmission/reception part 200 is disposed between the first focal position and the second focal position, near the first focal position, or near the second focal position. More specifically, there is a position where the gain is maximized in the above-mentioned area with respect to electromagnetic flux controlling member 400. Therefore, preferably, it is disposed at a position where the gain is maximized in the above-mentioned areas. In this manner, a communication module with a favorable gain can be obtained.

In addition, in the present embodiment, a range near something needs only to be within a range of (B–A)×0.2 or smaller, for example.

Effects

As described above, electromagnetic flux controlling member 400 can allow the parallel light to converge at the first focal position and the second focal position. In this manner, with the communication module including electromagnetic flux controlling member 400, favorable gain can be obtained as with the communication module including electromagnetic flux controlling member 300.

Embodiment 3

Figure 7A:
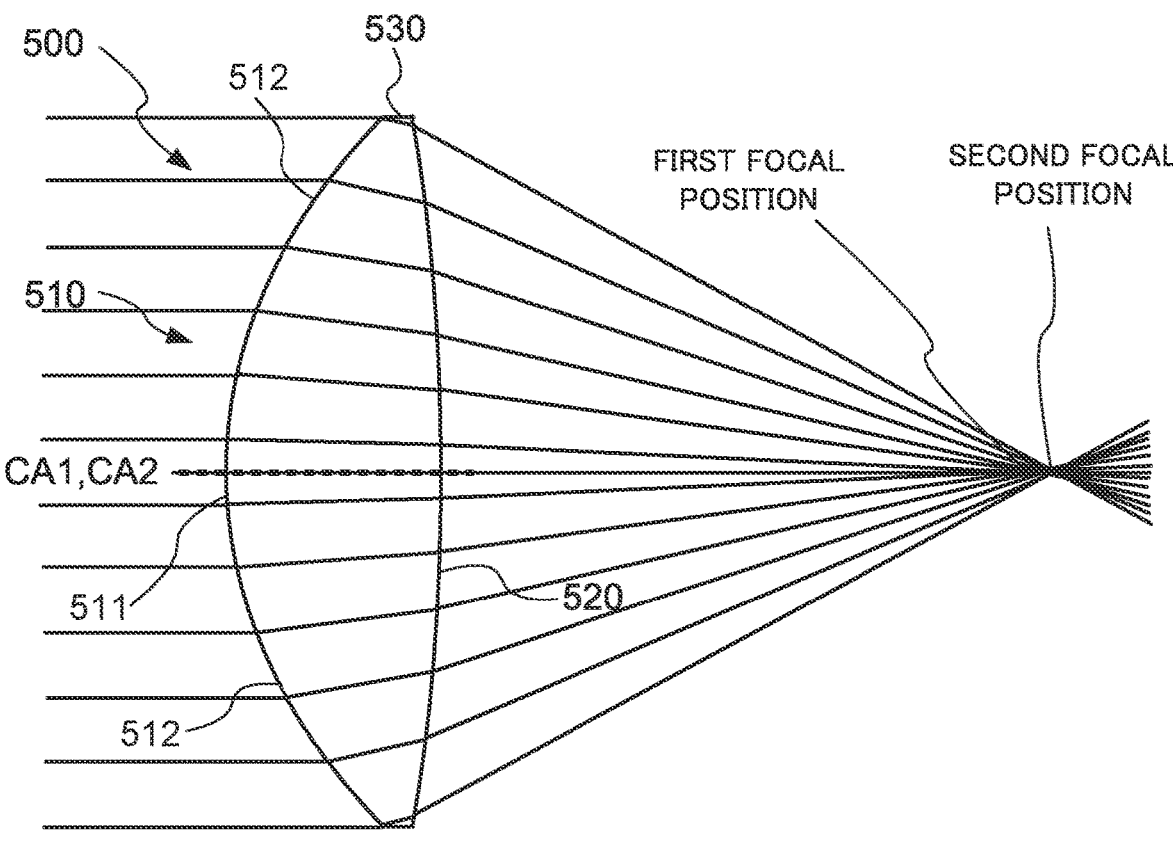
FIGS. 7A to 7C are diagrams illustrating an electromagnetic flux controlling member according to Embodiment 3.
Figures 7B, 7C:
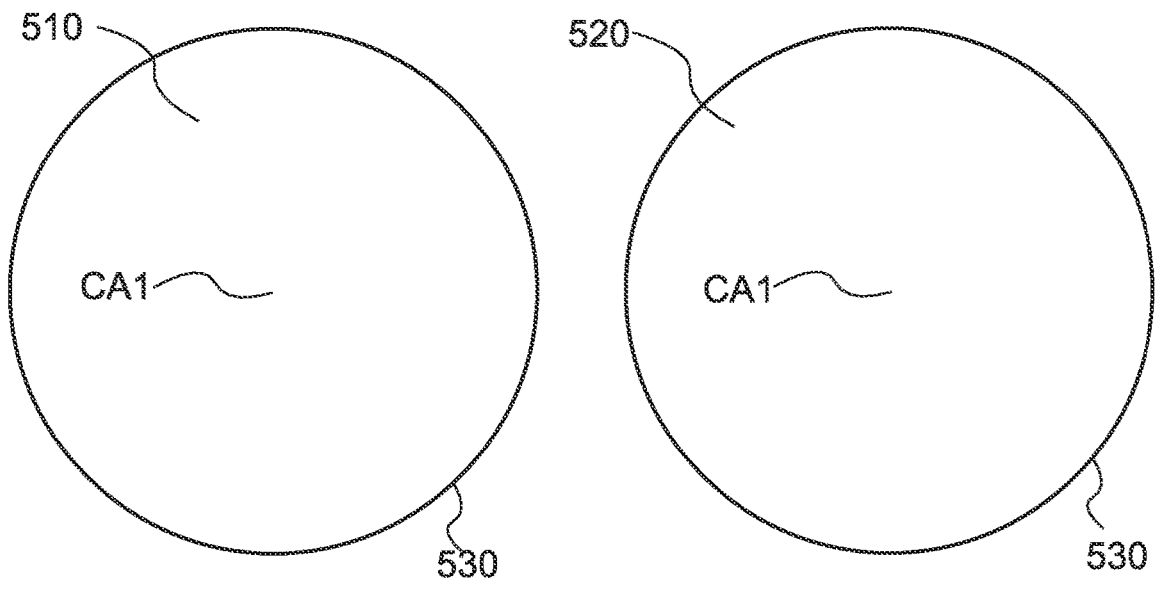

A communication module according to Embodiment 3 includes electromagnetic flux controlling member 500. FIG. 7A illustrates a cross-section including central axis CA1 of electromagnetic flux controlling member 500 according to Embodiment 3, FIG. 7B is a plan view as viewed from first surface 510, and FIG. 7C is a plan view as viewed from second surface 520.

In electromagnetic flux controlling member 500, first surface 510 is a convex surface as in electromagnetic flux controlling member 300, but electromagnetic flux controlling member 500 is different from electromagnetic flux controlling member 300 in that second surface 520 is a convex surface. Specifically, electromagnetic flux controlling member 500 has a biconvex lens shape. The configuration of electromagnetic flux controlling member 500 is substantially the same as that of electromagnetic flux controlling member 300 except that second surface 520 is a convex surface.

As illustrated in FIG. 7A, second surface 520 is disposed to intersect central axis CA1.

Electromagnetic flux controlling member 500 may or may not include side surface 530. In the present embodiment, electromagnetic flux controlling member 500 includes side surface 530.

Electromagnetic flux controlling member 500 including first surface 510 and second surface 520 is configured to be able to control the parallel light as illustrated in FIG. 7A.

Specifically, in electromagnetic flux controlling member 500, as in electromagnetic flux controlling member 300, first surface 510 includes first region 511 including an incidence portion of the near-axis light to be converged at the first focal position, the near-axis light being located closest to central axis CA1 of electromagnetic flux controlling member 500, and second region 512 disposed in a region surrounding first region 511 and including an incidence portion of light to be converged at the second focal position when parallel light is entered from first surface 510 and emitted from second surface 520. The second focal position is located at a position farther from electromagnetic flux controlling member 500 than the first focal position.

More specifically, in the present embodiment, the parallel light is entered from first surface 510 such that optical axis CA2 coincides with central axis CA1. Thus, in the present embodiment, the above-mentioned near-axis light closest to central axis CA1 coincides with the near-axis light beam closest to optical axis CA2.

In addition, in the present embodiment, (B–A)/f1 satisfies 0.1 to 1, where f1 is the focal length of a case where parallel light is entered from first surface 510 of electromagnetic flux controlling member 500, B is the distance to the second focal position from the intersection of central axis CA1 of electromagnetic flux controlling member and second surface 520, and A is the distance from the intersection to the first focal position.

In addition, it is preferable that electromagnetic flux controlling member 500 be configured such that the second focal position becomes farther from electromagnetic flux controlling member 500 as the position of light incident on second region 512 comes closer to the outer edge of first surface 510.

Preferably, transmission/reception part 200 is disposed with respect to electromagnetic flux controlling member 500 with the above-mentioned configuration in the following manner.

Specifically, preferably, the transmission/reception surface of transmission/reception part 200 is disposed between the first focal position and the second focal position, near the first focal position, or near the second focal position. More specifically, there is a position where the gain is maximized in the above-mentioned area with respect to electromagnetic flux controlling member 500. Therefore, preferably, it is disposed at a position where the gain is maximized in the above-mentioned areas. In this manner, a communication module with a favorable gain can be obtained.

In addition, in the present embodiment, a range near something needs only to be within a range of (B−A)×0.2 or smaller, for example.

Effects

As described above, electromagnetic flux controlling member 500 can allow the parallel light to converge at the first focal position and the second focal position. In this manner, with the communication module including electromagnetic flux controlling member 500, favorable gain can be obtained as with the communication module including electromagnetic flux controlling member 300.

INDUSTRIAL APPLICABILITY

The communication module and the electromagnetic flux controlling member according to the present invention are suitable for communications using electromagnetic waves (electromagnetic flux).

REFERENCE SIGNS LIST

20, 30, 300, 400, 500 Electromagnetic flux controlling member
32, 320, 420, 520 Second surface
100 Communication module
200 Transmission/reception part
200A Horn antenna
201 Upper opening
202 Lower opening
310, 410, 510 First surface
311, 411, 511 First region

312, 412, 512 Second region
330, 430, 530 Side surface
CA1 Central axis
CA2 Optical axis

The invention claimed is:

1. A communication module comprising:
a transmission/reception part configured to transmit or receive an electromagnetic flux; and
an electromagnetic flux controlling member configured to control the electromagnetic flux from the transmission/reception part or the electromagnetic flux to the transmission/reception part,
wherein the electromagnetic flux controlling member includes a first surface and a second surface, the first surface being a convex surface located on a side remote from the transmission/reception part, the second surface being a surface located on a side close to the transmission/reception part,
wherein the first surface of the electromagnetic flux controlling member includes a first region including an incidence portion of near-axis light to be converged at a first focal position, the near-axis light being located closest to a central axis of the electromagnetic flux controlling member, and a second region disposed in a region surrounding the first region and including an incidence portion of light to be converged at a second focal position when parallel light is entered from the first surface and emitted from the second surface, and
wherein the second focal position is located at a position farther from the electromagnetic flux controlling member than the first focal position.

2. The communication module according to claim 1, wherein (B−A)/f1 satisfies 0.1 to 1, where f1 is a focal length of the electromagnetic flux controlling member, B is a distance to the second focal position from an intersection of the central axis of the electromagnetic flux controlling member and the second surface, and A is a distance from the intersection to the first focal position.

3. The communication module according to claim 2, wherein (B−A)/f1 satisfies 0.1 to 1 when the second focal position is set as a position where light entered from an outer edge of the first surface converges.

4. The communication module according to claim 1, wherein a transmission/reception surface of the transmission/reception part is disposed between the first focal position and the second focal position, near the first focal position, or near the second focal position.

5. The communication module according to claim 1, wherein the second surface is a flat surface, a concave surface, or a convex surface.

6. The communication module according to claim 1, wherein the transmission/reception part transmits or receives a millimeter wave, a quasi-millimeter wave, or a terahertz wave.

7. An electromagnetic flux controlling member configured to be used for the communication module according to claim 1.

* * * * *